(12) United States Patent
Liu (10) Patent No.: US 11,960,402 B2
(45) Date of Patent: Apr. 16, 2024

(54) INTEGRATED CIRCUIT AND CONFIGURATION METHOD THEREOF

(71) Applicant: SigmaStar Technology Ltd., Fujian (CN)

(72) Inventor: Xiaolong Liu, Shanghai (CN)

(73) Assignee: SIGMASTAR TECHNOLOGY LTD., Fujian (CN)

(*) Notice: Subject to any disclaimer, the term of this patent is extended or adjusted under 35 U.S.C. 154(b) by 0 days.

(21) Appl. No.: 17/968,938

(22) Filed: Oct. 19, 2022

(65) Prior Publication Data

US 2023/0140158 A1  May 4, 2023

(30) Foreign Application Priority Data

Oct. 29, 2021 (CN) .................. 202111274182.8

(51) Int. Cl.
G06F 12/0831 (2016.01)
G06F 12/02 (2006.01)
G06F 13/16 (2006.01)
G06N 3/08 (2023.01)

(52) U.S. Cl.
CPC ...... *G06F 12/0835* (2013.01); *G06F 12/0292* (2013.01); *G06F 13/1673* (2013.01); *G06N 3/08* (2013.01)

(58) Field of Classification Search
None
See application file for complete search history.

(56) References Cited

U.S. PATENT DOCUMENTS 10,613,881 B2 * 4/2020 Lee .................. G06F 13/28

* cited by examiner

*Primary Examiner* — Charles J Choi
(74) *Attorney, Agent, or Firm* — Edell, Shapiro & Finnan, LLC (57) ABSTRACT

An integrated circuit and a configuration method thereof are disclosed. The integrated circuit, applied to a neural network model calculation, includes a first operator engine, a second operator engine, a random access memory (RAM) and a direct memory access (DMA) engine. The first operator engine is configured to perform a first calculation operation. The second operator engine is configured to perform a second calculation operation. The DMA engine performs an access operation on the RAM according to a first memory management unit (MMU) table when the first operator engine performs the first calculation operation, and performs an access operation on the RAM according to a second MMU table when the second operator engine performs the second calculation operation.

12 Claims, 10 Drawing Sheets

INTEGRATED CIRCUIT AND CONFIGURATION METHOD THEREOF

This application claims the benefit of China application Serial No. CN202111274182.8, filed on Oct. 29, 2021, the subject matter of which is incorporated herein by reference.

BACKGROUND OF THE INVENTION

Field of the Invention

The present invention relates to circuit design, and more particularly, to an integrated circuit and a configuration method thereof.

Description of the Related Art

According to related technologies, a neural network model is applicable to various types of processes so as to achieve goals that cannot be realized by simple logic circuits. However, certain issues may occur. For example, related calculations of the neural network model may be immense, and a memory capacity needed by these calculations is also huge. In an attempt of implementing the neural network model to an electronic product, related costs are correspondingly increased since great memory resources are demanded. Therefore, there is a need for a novel method and associated architecture, so as to implement a compact, fast and reliable electronic product without bringing side-effects or less likely incurring side-effects.

SUMMARY OF THE INVENTION

It is an object of the present invention to provide an integrated circuit (IC) and a configuration method thereof so as to solve the issues above.

The integrated circuit, applied to a neural network model calculation, includes a first operator engine, a second operator engine, a random access memory (RAM) and a direct memory access (DMA) engine. The first operator engine is configured to perform a first calculation operation. The second operator engine is configured to perform a second calculation operation. The DMA engine performs an access operation on the RAM according to a first memory management unit (MMU) table when the first operator engine performs the first calculation operation, and performs an access operation on the RAM according to a second MMU table when the second operator engine performs the second calculation operation.

A configuration method of an integrated circuit is provided according to an embodiment of the present invention. The configuration method includes: partitioning all tensor memories needed for a calculation of a neural network model into to a plurality of corresponding predetermined unit pages; performing data dependency analysis individually on the plurality of predetermined unit pages to establish a plurality of data dependencies, and allocating a plurality of virtual buffers to the plurality of predetermined unit pages according to the plurality of data dependencies; performing life cycle analysis individually on the plurality of virtual buffers, wherein an analysis result of the life cycle analysis indicates respective life cycles of the plurality of virtual buffers; allocating a plurality of physical buffers according to the analysis result; and establishing a plurality of predetermined memory management unit (MMU) tables to record mapping relationships between virtual addresses and physical addresses, so as to allow the integrated circuit to look up at least one physical address for data access according to at least one mapping relationship in a pre-loaded MMU table in a utilization stage, wherein the pre-loaded MMU table is selected from the plurality of predetermined MMU tables.

One benefit of the present invention is that, with a carefully designed memory management mechanism, the integrated circuit and the configuration method thereof of the present invention are capable of accomplishing extremely complicated calculations of the neural network model using limited memory resources. Because memory resources can be properly managed, the integrated circuit and the configuration method thereof of the present invention can prevent an overly large memory requirement and avoid unnecessary additional costs. Compared to the prior art, the integrated circuit and the configuration method thereof of the present invention are capable of implementing a compact, fast and reliable electronic product without bringing side-effects or less likely incurring side-effects.

DETAILED DESCRIPTION OF THE INVENTION

Figure 1:
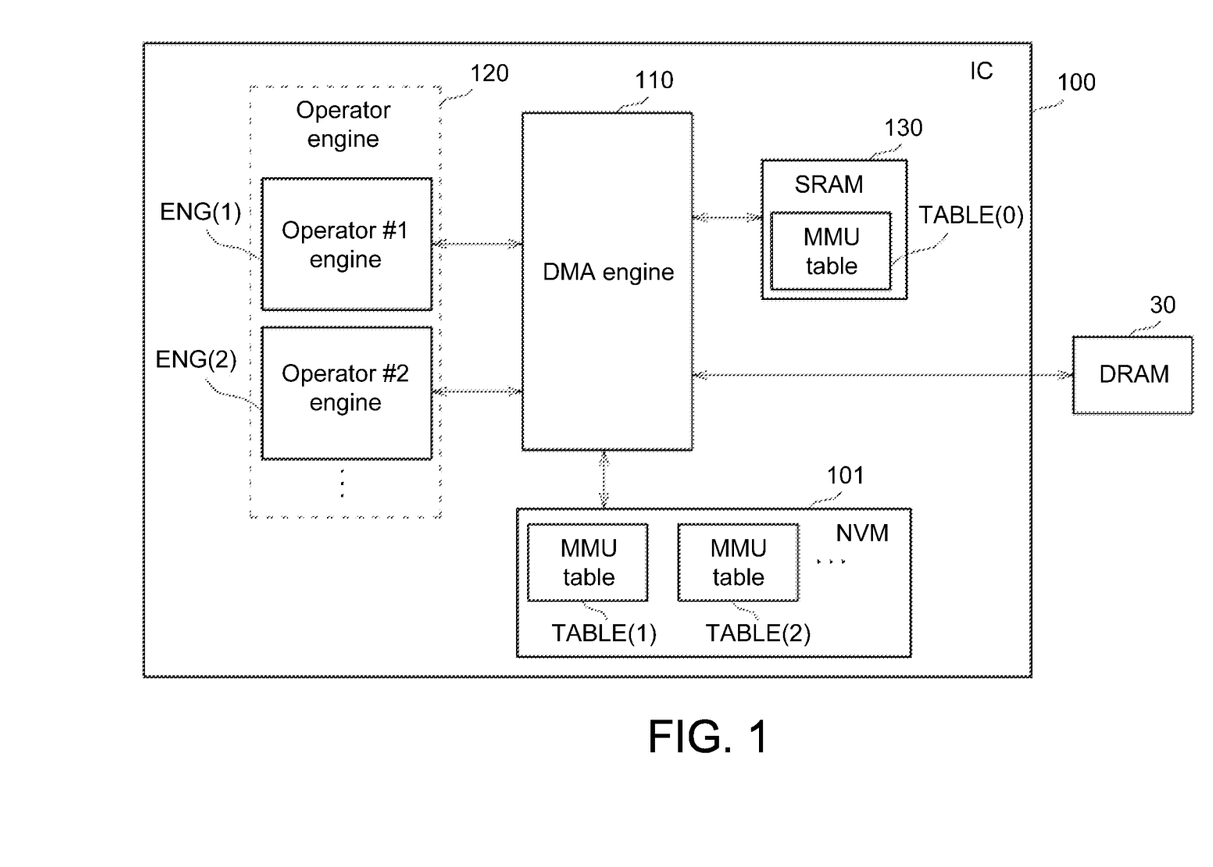
FIG. 1 is a schematic diagram of an integrated circuit according to an embodiment of the present invention.

FIG. 1 shows a schematic diagram of an integrated circuit (IC) 100 according to an embodiment of the present invention. The integrated circuit 100 may include a non-volatile memory (NVM) 101, a direct memory access (DMA) engine 110, a plurality of operator engines 120, and a random access memory (RAM) such as a static random access memory (SRAM) 130, wherein the operator engines 120 may include an operator #1 engine ENG(1) and an operator #2 engine ENG(2) for respectively implementing an operator #1 and an operator #2. In the drawing, the arrows among these elements indicate that these elements are coupled to one another. It should be noted that the present invention is not limited to the examples above. For example, the integrated circuit 100 may further include a processing circuit such as a central processing unit (CPU, not shown), and the elements above may be coupled to one another by a bus. For better understanding, a dynamic random access memory (DRAM) 30 may be depicted as being coupled to the integrated circuit 100, and more particularly, to the DMA engine 110. In this embodiment, the NVM 101 can be implemented by means such as an electrically erasable programmable read-only memory (EEPROM) or a flash memory.

As shown in FIG. 1, the NVM 101 can store a plurality of predetermined memory management unit (MMU) tables such as MMU tables TABLE(1) and TABLE(2), and the SRAM 130 may store a pre-loaded MMU table such as an MMU table TABLE(0). According to a configuration method of the integrated circuit 100, in a configuration stage of the integrated circuit 100, a production tool such as a host device (for example, a personal computer) executing a first production tool code may configure the integrated circuit 100 to write the plurality of predetermined MMU tables such as the MMU tables TABLE(1) and TABLE(2) into the NVM 101, so as to allow the integrated circuit 100 (for example, the CPU) to load any of the predetermined MMU tables to a predetermined position (for example, an MMU table region) in the SRAM 130 in a utilization stage, as the pre-loaded MMU table such as the MMU table TABLE(0), wherein the any predetermined MMU table may record mapping relationships between virtual addresses and physical address. However, the present invention is not limited to the examples above. For example, the CPU executing a second production tool code may play the role of the production tool, and more particularly, may configure the integrated circuit 100 in the configuration stage to write the plurality of predetermined MMU tables such as the MMU tables TABLE(1) and TABLE(2) into the NVM 101, so as to allow the integrated circuit 100 (for example, the CPU and/or the DMA engine 110) to load any of the plurality of predetermined MMU tables to the predetermined position (for example, the MMU table region) in the SRAM 130 in the utilization stage, as the pre-loaded MMU table such as the MMU table TABLE(0). These production tool codes corresponding to the configuration method may be modified versions of one another, and may vary according to such as respective platform architecture and operating systems of the host device and the integrated circuit 100.

In the utilization stage, the operator engines 120 such as the operator #1 engine ENG(1) and the operator #2 engine ENG(2) may perform a plurality of calculation operations of a neural network model, the SRAM 130 may temporarily store information such as the pre-loaded MMU table, data related to the neural network model and user data, and the DMA engine 110 may perform a DMA operation on the SRAM 130 (for example, a data region therein) for the operator engines 120 according to the pre-loaded MMU table such as the MMU table TABLE(0), wherein the pre-loaded MMU table such as the MMU table TABLE(0) is selected from the plurality of predetermined MMU tables such as the MMU tables TABLE(1) and TABLE(2) and corresponds to a part of the plurality of calculation operations. The integrated circuit 100 (for example, the CPU and/or the DMA engine 110) may select a first predetermined MMU table (for example, the MMU table TABLE(1)) corresponding to at least one first calculation operation of the plurality of calculation operations from the plurality of predetermined MMU tables as the pre-loaded MMU table, that is, loading the first predetermined MMU table to the predetermined position in the SRAM 130 before the first calculation operation is performed, so as to allow at least one first operator engine of the plurality of operator engines to complete the at least one first calculation operation. More particularly, the DMA engine 110 may perform the DMA operation on the SRAM 130 or the DRAM 30 for the at least first one operator engine according to the first predetermined MMU table used as the pre-loaded MMU table. Further, the integrated circuit 100 (for example, the CPU and/or the DMA engine 110) may select a second predetermined MMU table (for example, the MMU table TABLE(2)) corresponding to at least one second calculation operation of the plurality calculation operations from the plurality of predetermined MMU tables as the pre-loaded MMU table, that is, loading the second predetermined MMU table to the predetermined position in the SRAM 130 before the second calculation operation is performed, so as to allow at least one second operator engine of the plurality of operator engines to complete the at least one second calculation operation. More particularly, the DMA engine 110 may perform the DMA operation on the SRAM 130 or the DRAM 30 for the at least one second operator engine according to the second predetermined MMU table used as the pre-loaded MMU table. For better understanding, any operator engine of the operator engines 120 may perform at least one calculation operation on at least one node of nodes of one layer among nodes of a plurality of layers of the neural network model; however, the present invention is not limited to the example above.

On the basis of the architecture in FIG. 1, the integrated circuit 100 may dynamically select one of the plurality of predetermined MMU tables as the pre-loaded MMU table, so as to update the pre-loaded MMU table. The pre-loaded MMU table may record the mapping relationships suitable for a current calculation operation, for example, mapping relationships between certain virtual addresses and certain physical addresses related to the current calculation operation, and the DMA engine 110 may look up at least one physical address for data access according to at least one mapping relationship in the pre-loaded MMU table. Because memory resources can be properly managed, the integrated circuit 100 and the configuration method thereof of the present invention can prevent an overly large memory requirement and avoid unnecessary additional costs.

According to some embodiments, the plurality of MMU tables such as the MMU tables TABLE(1) and TABLE(2) as well as the pre-loaded MMU table such as the MMU table TABLE(0) may be implemented by means of a paged memory management unit (PMMU), and more particularly, implemented as a PMMU table, in which mapping relationships recorded can be managed in a unit of pages. For example, data flowing between a layer and a layer in the neural network model may be described as tensors, which may be regarded as data that practically occupies a memory (for example, the SRAM 130 and the DRAM 30). The configuration method can configure the integrated circuit 100 to operate suitably for characteristics of the neural network model, and more particularly, the plurality of predetermined MMU tables such as a plurality of PMMU tables are established in the utilization stage, to allow the integrated circuit 100 to dynamically select the plurality of predetermined MMU tables (for example, one of the plurality of predetermined PMMU tables) in the utilization stage as the pre-loaded MMU table (for example, the pre-loaded PMMU table), so as to update the pre-loaded MMU table. For brevity, similar details in these embodiment are not repeated.

Figure 2:
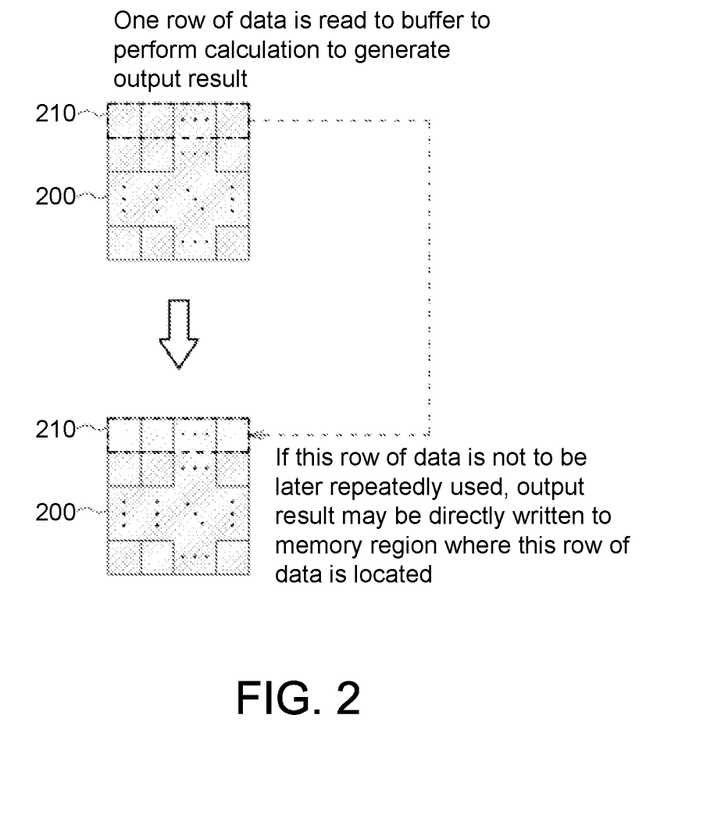
FIG. 2 is a memory region reuse control solution of a configuration method of the integrated circuit in FIG. 1 according to an embodiment of the present invention.

FIG. 2 shows a memory region reuse control solution of the configuration method of the integrated circuit 100 in FIG. 1 according to an embodiment of the present invention. For better understanding, the integrated circuit 100 may logically combine at least a part (for example, a part or all) of the SRAM 130 and at least a part (or example, a part or all) of the DRAM 30 as a memory 200, and can access any of a plurality of memory regions of the memory 200, for example, a memory region 210. It should be noted that the present invention is not limited to the examples above.

As shown in the upper half of FIG. 2, when a first operator engine (for example, the operator #1 engine ENG(1)) of the operator engines 210 performs a first calculation operation for a set of data (for example, a row of data), the DMA engine 110 may search the pre-loaded MMU table according to a first virtual address corresponding to the set of data to obtain a first physical address of a memory region in the memory 200 (for example, the RAM such as the SRAM 130 or an external RAM such as the DRAM 30), for example, such as a physical address of the memory region 210, and accordingly read the set of data from the memory region 210 to allow the first operator engine to perform the first calculation operation according to the set of data, so as to generate a first calculation result as an output result of the first operator engine. As shown in the lower half of FIG. 2, when this set of data such as this row of data is no longer used, the DMA engine 110 may determine the memory region 210 according to the pre-loaded MMU table such as the MMU table TABLE(0), and write the first calculation result to the memory region 210. For example, the integrated circuit 100 (for example, the CPU and/or the DMA engine 110) may determine whether this row of data is not to be later repeatedly used, and more particularly, when this row of data is not to be later repeatedly used, the output result such as the first calculation result may then be directly written to the memory region 210 where this row of data is located; however, the present invention is not limited to the example above.

In one embodiment, the DMA engine 110 may search the pre-loaded MMU table according to a second virtual address corresponding to the first calculation result to obtain a second physical address, and accordingly store the first calculation result to the memory region at the second physical address. After the first calculation result, the operator #2 engine ENG(2) performs a second calculation operation. For example, the second predetermined MMU table is loaded to the predetermined position in the SRAM 130, the DMA engine 110 searches the second predetermined MMU table according to a corresponding third virtual address to obtain a second physical address, and the DMA engine 110 reads the first calculation result from the corresponding memory region according to the second physical address for the operator #2 engine ENG(2) to perform the second calculation operation. In this example, although the second virtual address is different from the third virtual address, they map to the same physical address through the first predetermined MMU table and the second predetermined MMU table, respectively. The mapping relationships between the virtual addresses and the physical addresses in the first predetermined MMU table enable the operator #1 engine ENG(1) to effectively utilize the SRAM 130 and the DRAM 30 when the first calculation operation is performed, and the mapping relationships between the virtual addresses and the physical addresses in the second predetermined MMU table enable the operator #2 engine ENG(2) to effectively utilize the SRAM 130 and the DRAM 30 when the second calculation operation is performed.

In some embodiments, during the calculation related to the neural network model performed by the integrated circuit 100, the calculation and transmission of intermediate data such as the tensors requires a memory as a carrier, and a required memory capacity may change along with the number of input nodes of the neural network model and the depth of the neural network model. Further, in order to optimize the utilization of memory resources in the utilization stage, the production tool (for example, the host device executing the first production tool code, or the CPU executing the second production tool code) may perform the following operations in the configuration stage according to the configuration method:

(1) partitioning all tensor memories (for example, a memory space needed for all the tensors) needed for the calculation of the neural network model into a plurality of corresponding predetermined unit pages;

(2) performing data dependency analysis individually on the plurality of predetermined unit pages to establish a plurality of data dependencies (for example, data output by a certain operator is data input by another operator), and allocating a plurality of virtual buffers to the plurality of predetermined unit pages according to the plurality of data dependencies;

(3) performing life cycle analysis individually on the plurality of virtual buffers, wherein an analysis result of the life cycle analysis indicates respective life cycles of the plurality of virtual buffers;

(4) allocating a plurality of physical buffers according to the analysis result; and (5) on the basis of the plurality of physical buffers allocated, establishing a plurality of predetermined MMU tables to record mapping relationships between virtual addresses and physical addresses, so as to allow hardware (for example, the DMA engine 110) of the integrated circuit 100 to look up at least one physical address for data access according to at the least one mapping relationship in the pre-loaded MMU table in the utilization stage. It should be noted that present invention is not limited to the examples above. For better understanding, the plurality of virtual buffers may respectively represent temporary storage spaces needed for the transmission of all data streams in the neural network model, and may also be regarded as a total temporary storage space corresponding to all line segments in the mesh structure. During the life cycle analysis, the production tool may determine the life cycle of any tensor of the required memory resources according to orders of nodes of various layers (for example, execution orders of corresponding operators) of the neural network model, so as to control the required memory space occupied by any of the tensors during a live period. When any tensor changes from a live state to a non-live state, the memory space is timely released for continual use of a subsequent tensor (for example, a tensor changing from a non-live state to a live state). For brevity, similar details in these embodiment are not repeated.

Figure 3:
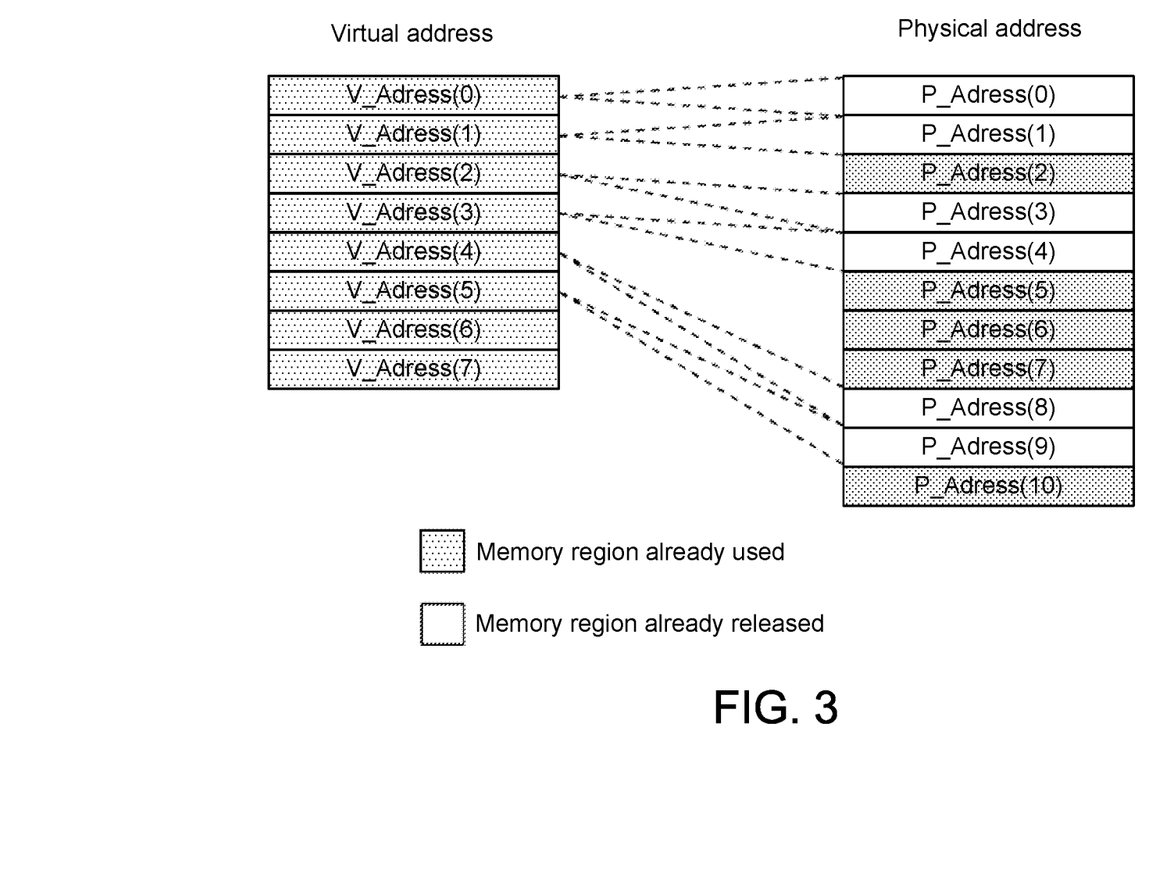
FIG. 3 is a memory mapping control solution of the configuration method according to an embodiment of the present invention.

FIG. 3 shows a memory mapping control solution of the configuration method according to an embodiment of the present invention. To optimize the use of memory resources in the utilization stage, the size of a memory space needed by the subsequent tensors may match the size of a previously released memory, regardless of whether the previously released memory is discrete. The memory mapping control solution can integrate a plurality of discrete memory regions into a memory space needed by a subsequent tensor, so as to allow access by the DMA engine 110 according to consecutive addresses, and more particularly, accessing a memory space of a predetermined size, starting from a starting address. For example, the DMA engine 110 may map at least a part (for example, V_Address(0) to V_Address(5)) to non-consecutive or partially non-consecutive physical addresses (for example, {P_Address(0), P_Address(1), P_Address(3), P_Address(4), P_Address(8) and P_Address (9)) according to the pre-loaded MMU table such as the MMU table TABLE(0), so as to integrate released memory regions (but not memory regions that are already in use) into a memory space needed by one or more subsequent tensors. For brevity, similar details in this embodiment are not repeated.

According to some embodiments, the plurality of predetermined unit pages have a common page size greater than one bit, and the common page size is defined by a predetermined bit count. Typically, the size of a tensor memory is usually quite large. Assuming that actual memories (for example, the SRAM 130 and the DRAM 30) configured in a unit of bits are used as a tensor memory, each of the plurality of predetermined MMU tables may have an extremely large number of mapping relationships and hence become infeasible. Thus, the predetermined bit count should be greater than 1. For example, hardware (for example, the DMA engine 110) in the integrated circuit 100 may access data in a basic unit of 256 bits. Due to certain factors such as the basic unit, the shapes of data streams (for example, distribution of tensors) in the neural network model, the size of granularity (for example, the predetermined bit count), efficiency of software scheduling, and relations between some of the factors (for example, the number of buffers increases and scheduling becomes slower as the granularity decreases, or the level of multiplexing of the SRAM 130 gets lower as the granularity increases), the predetermined bit count may be equal to 4k, where $k=2^{10}=1024$. Moreover, the plurality of predetermined unit pages may represent a plurality of 4k-bit pages, wherein the atom unit size of the mapping relationships in the plurality of predetermined MMU tables is equal to the predetermined bit count such as 4k. It should be noted that the present invention is not limited to the examples above. In some examples, the predetermined bit count may be equal to k or a multiple of k, such as any of 1k, 2k . . . . For brevity, similar details in these embodiment are not repeated.

Figure 4:
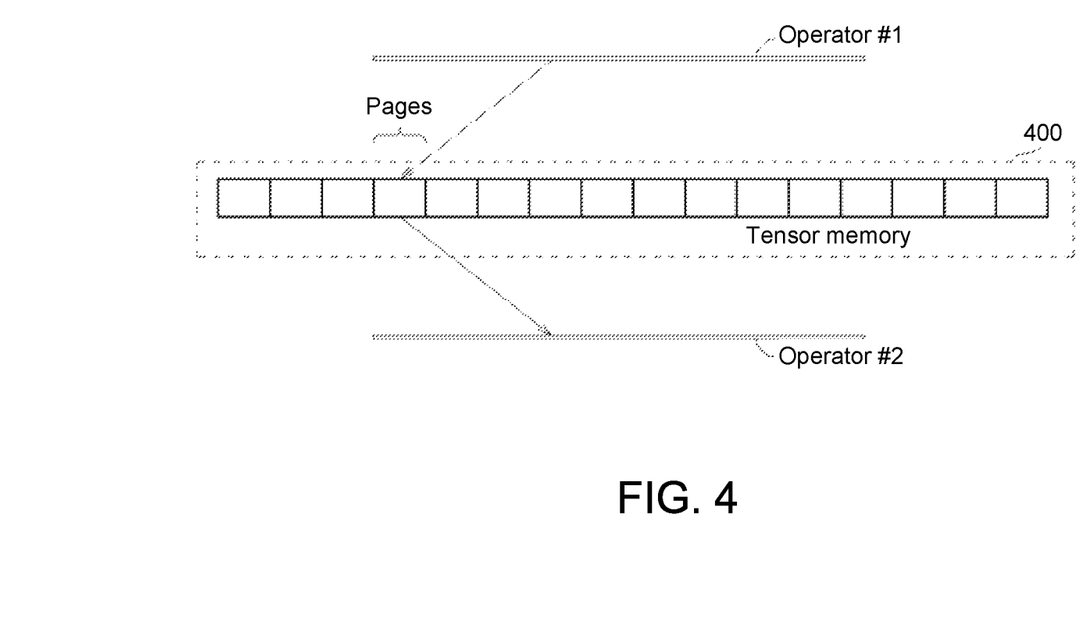
FIG. 4 is a data dependency analysis control solution of the configuration method according to an embodiment of the present invention.

FIG. 4 shows a data dependency control solution of the configuration method according to an embodiment of the present invention, wherein a tensor memory 400 and a plurality of pages therein may serve as examples of the tensor memory and the plurality of predetermined unit pages above. The plurality of data dependencies may include buffer dependencies of all data, and establishing these data dependencies can ensure that data output by a first-stage operator (for example, the operator #1) between two consecutive operators and data input by a second-stage operator (for example, the operator #2) between the two consecutive operators are in the same buffer. In the mesh structure of the neural network model, output data of the first-stage operator is input data of the second-stage operator. Based on the characteristic above and the page partitioning of the plurality of predetermined unit pages, the production tool may perform data tracking in a unit of the common page size to generate dependencies in a unit of pages, so as to temporarily associate the output data and the input data by a virtual buffer (for example, a predetermined unit page such as a 4k-bit page), and such relationship may be referred to as a buffer dependency. For brevity, similar details in this embodiment are not repeated.

Figure 5:
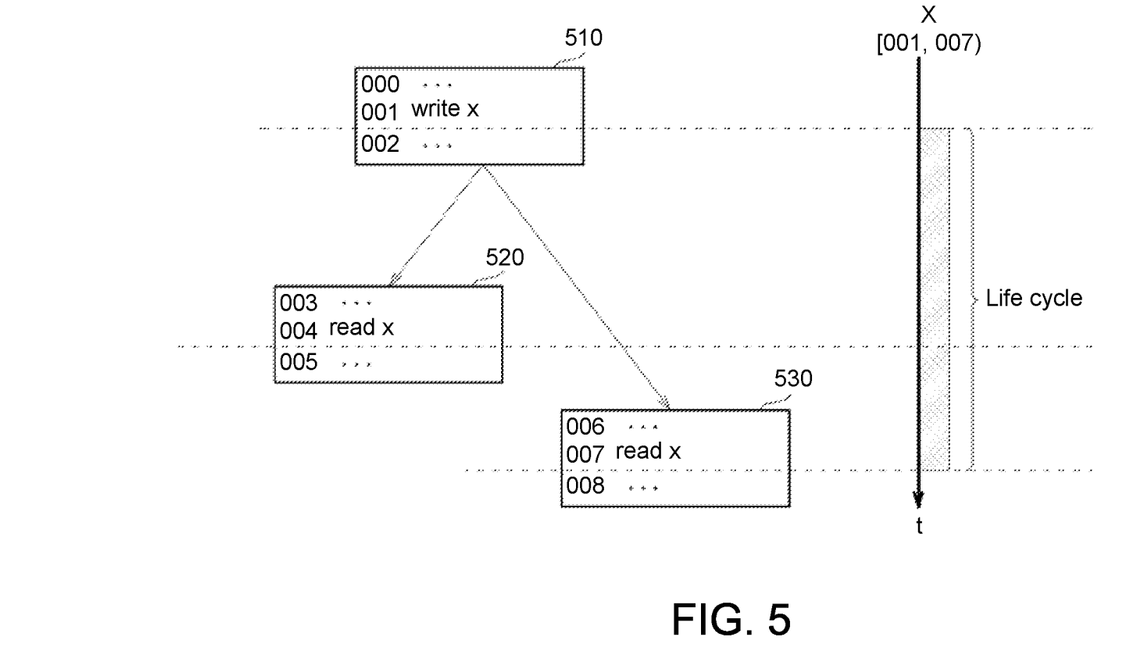
FIG. 5 is a life cycle analysis control solution of the configuration method according to an embodiment of the present invention.

FIG. 5 shows a life cycle analysis control solution of the configuration method according to an embodiment of the present invention. The code for implementing the plurality of calculation operations may include a plurality of partial codes 510, 520 and 530, which may respectively correspond to line indices {000, 001, 002}, {003, 004, 005} and {006, 007, 008}, commands "write x" and "read x" may respectively represent a write variable x and a read variable x, and a symbol " . . . " represents omitted commands. For an example using a page PAGE(x) as the virtual buffer, a life cycle thereof may be represented as: [001, 007), wherein on a time axis representing time t, the line indices 001 to 00N such as 000 and 001 may be used to indicate timings, and an interval [001, 007) between a timing at which the page PAGE(x) is generated and a timing at which the page PAGE(x) is last used may be regarded as a life cycle of the page PAGE(x).

According to some embodiments, the indication means for the life cycle may be modified. For example, the life cycle of the page PAGE(x) may be indicated as an interval [001, 007]. For brevity, similar details in these embodiment are not repeated.

Figure 6:
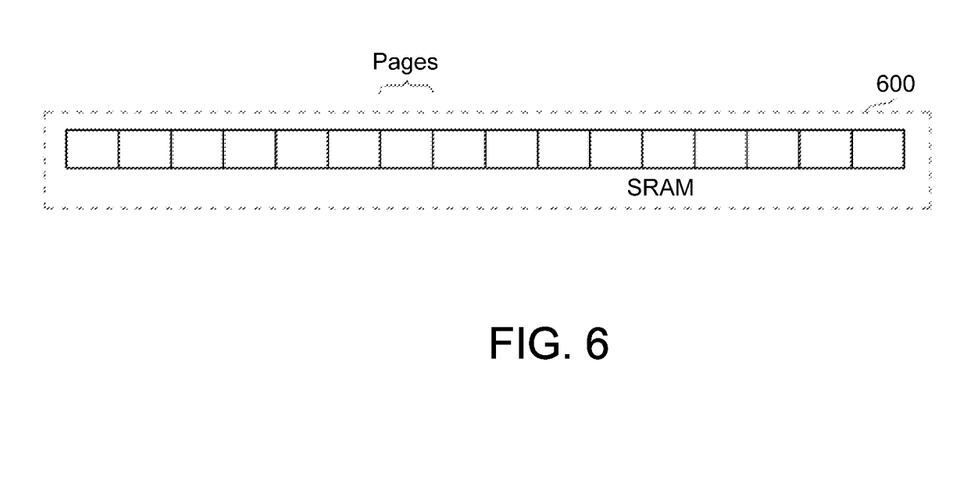
FIG. 6 is a physical buffer allocation control solution of the configuration method according to an embodiment of the present invention.
Figure 7:
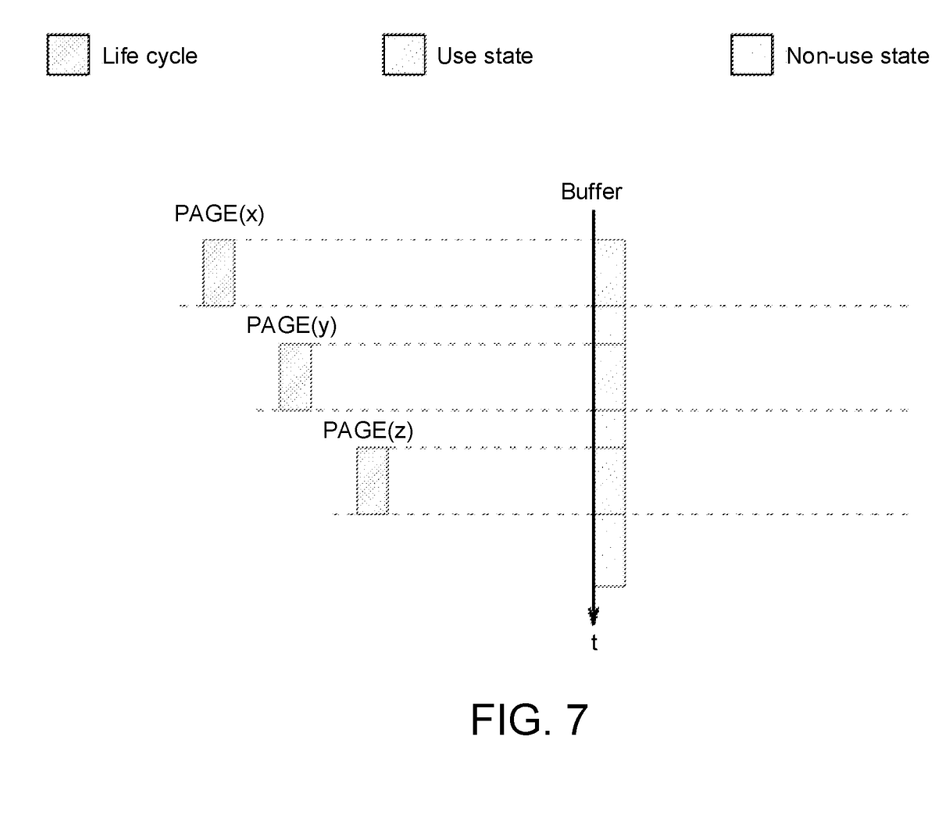
FIG. 7 depicts implementation details of the physical buffer allocation control solution shown in FIG. 6.

FIG. 6 shows a physical buffer allocation control solution of the configuration method according to an embodiment of the present invention. FIG. 7 shows implementation details of the physical buffer allocation control solution shown in FIG. 6, wherein an SRAM 600 may serve as an example of a data region in the SRAM 130. The production tool may also partition actual memories (for example, the SRAM 130 and the DRAM 30) according to the predetermined bit count such as 4k, and more particularly, partitioning the data regions therein into a plurality of pages (for examples, the pages in the SRAM 600) having the common page size to serve as the plurality of physical buffers, and allocate the plurality of physical buffers according to the respective life cycles of the plurality of virtual buffers. The plurality of virtual buffers may include pages PAGE(x), PAGE(y) and PAGE(z) respectively corresponding to the variables x, y and z, and have life cycles that do not overlap one another. In this case, the production tool may allocate the same physical buffer (denoted as "buffer" in FIG. 7 for brevity) of the plurality of physical buffers as actual memory spaces for the pages PAGE(x), PAGE(y) and PAGE(z) in different time intervals. For example, first, second and third virtual buffers, such as the pages PAGE(x), PAGE(y) and PAGE(z), occupy the physical buffer in the respective life cycles so that the physical buffer is in a use state, and the physical buffer is released once the respective life cycles thereof end and becomes being in an non-use state, wherein the physical buffer becomes being in a non-used state once released and can be used by a next virtual buffer. The production tool may record an allocation result (for example, mapping relationships between virtual addresses and physical addresses) of the plurality of physical virtual buffers in the plurality of predetermined MMU tables, for example, calculation orders and calculation methods of the neural network model according to one or more memory management factors, and optimize the allocation of the plurality of physical buffers for different batches of calculations so as to establish the plurality of predetermined MMU tables. For brevity, similar details in this embodiment are not repeated.

Figure 8:
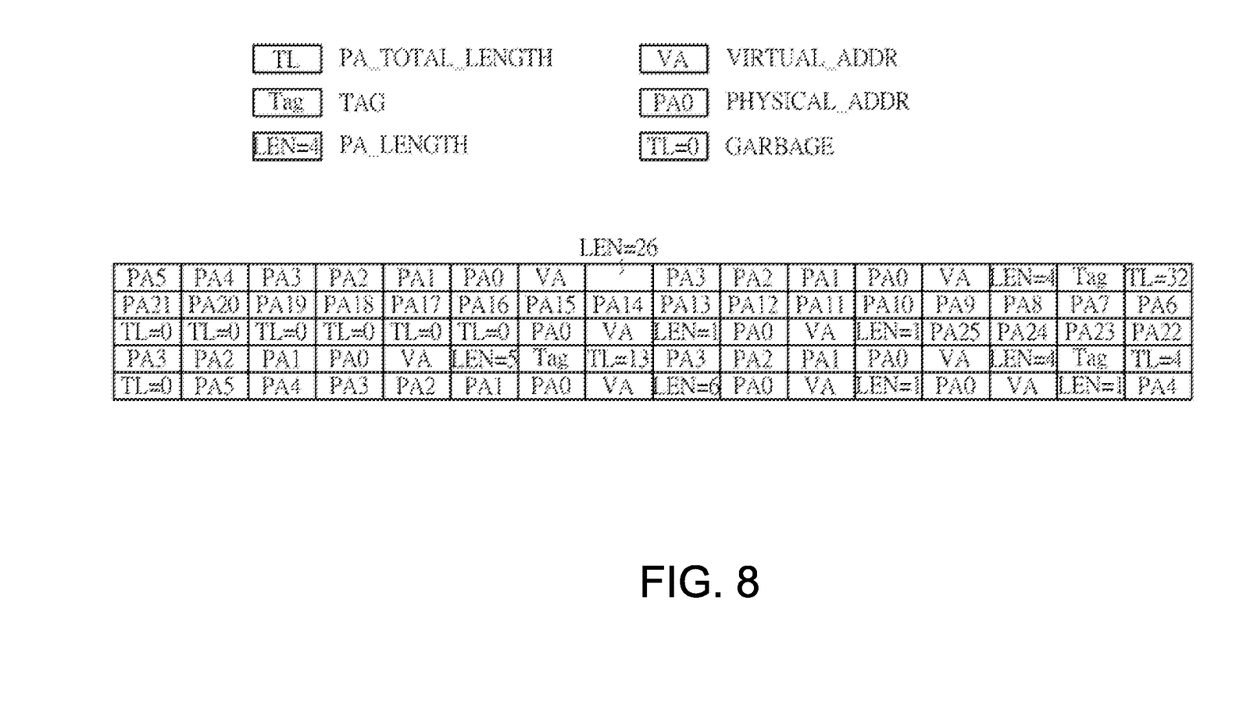
FIG. 8 is a dynamic memory management unit (MMU) control solution of the configuration method according to an embodiment of the present invention.

FIG. 8 shows a dynamic MMU control solution of the configuration method according to an embodiment of the present invention. The production tool may record virtual addresses of a plurality of virtual addresses associated with the allocated plurality of physical buffers and physical addresses of the physical buffers in the plurality of predetermined MMU tables. The dynamic MMU control solution provides a format that can be dynamically changed so as to establish the plurality of predetermined MMU tables. The exemplary types PA_TOTAL_LENGTH, TAG, PA_LENGTH, VIRTUAL_ADDR, PHYSICAL_ADDR and GARBAGE in the drawing may respectively represent a total length of a series of physical addresses in this format, an identifier of this format, a length of a set of physical addresses (for example, one or more physical addresses) in the series of physical addresses in this format, a virtual address (for example, a starting address) associated with this set of physical addresses, this set of physical addresses and garbage information (for example, null information). Further, the fields TL, Tag, LEN, VA and PA0 may respectively be carried with the total length, the identifier, the length of this set of physical addresses, the virtual address and this set of physical addresses. For example, "TL=32" in the 1st field on the upper right corner in this format indicates that the total length is equal to 32, the identifier "Tag" in the 2nd field indicates that the contents currently recorded in the table conforms to this format, and "LEN=4" in the 3rd field indicates that four consecutive virtual addresses starting from the virtual address "VA" in the 4th field are respectively mapped to a first set of physical addresses "PA0 to PA3" in the 5th to 8th fields. "LEN=26" in the 9th field adjacently following the fields "PA0 to PA3" indicates that 26 consecutive virtual addresses starting from the virtual address "VA" in the 10th field are mapped to a second set of physical addresses "PA0 to PA25" in the 11th to 36th fields. "LEN=1" in the 37th field adjacently following the fields "PA0 to PA25" indicates that 1 virtual address starting from the virtual address "VA" in the 38th field is mapped to a third set of a physical address "PA0" in the 39th field. "LEN=1" in the 40th field adjacently following the field "PA0" in the 39th field indicates that 1 address starting from the virtual address "VA" in the 41st field is mapped to a fourth set of a physical address "PA0" in the $42^{nd}$ field. A total of the numbers 4, 26, 1 and 1 of the respective physical addresses of the four sets of physical addresses above is equal to 32, which conforms to "TL=32" (the total length is equal to 32) in the 1st field. "TL=0" in the subsequent six fields indicates that the total length is 0, and thus represents garbage information. For brevity, similar details in this embodiment are not repeated.

Figure 9:
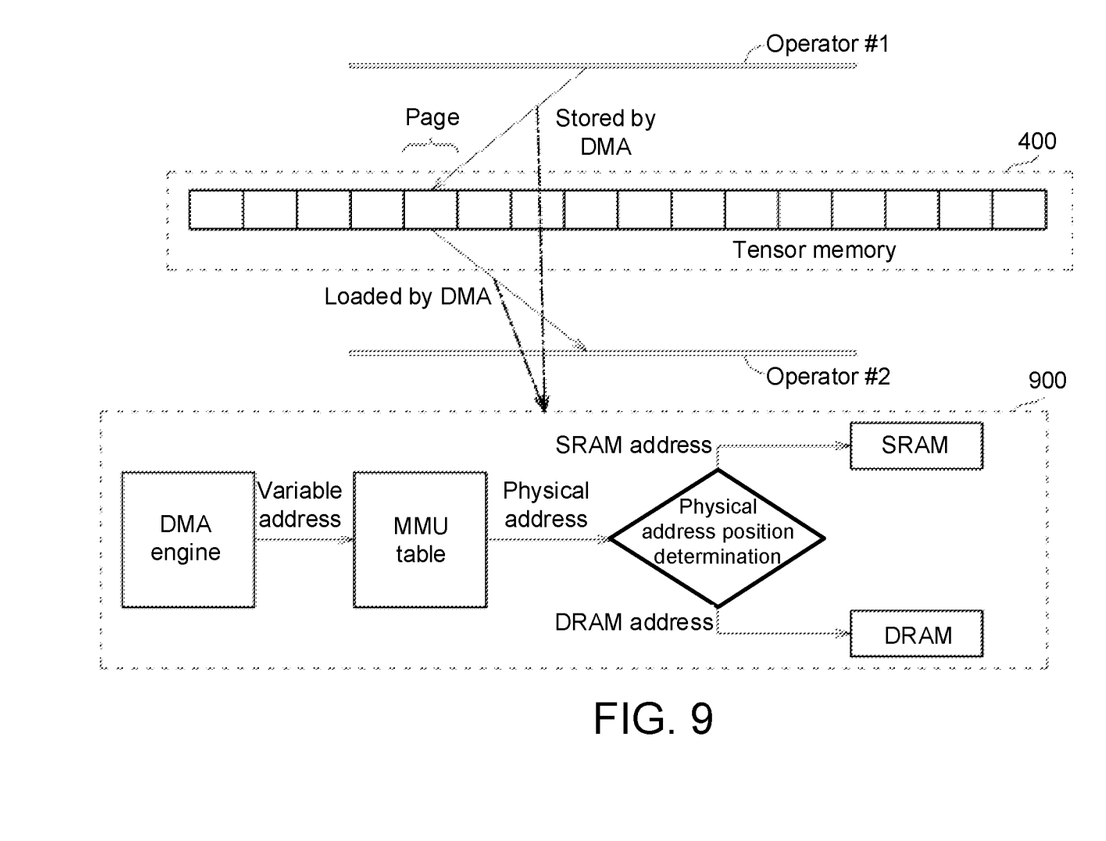
FIG. 9 is a dynamic memory access (DMA) control solution of the configuration method according to an embodiment of the present invention.

FIG. 9 shows a dynamic memory access (DMA) control solution of the configuration method according to an embodiment of the present invention. Since virtual addresses are consecutive, hardware (for example, the DMA engine 110) in the integrated circuit 100 may access data according to the virtual addresses (for example, starting from the starting address, accessing a memory space of the predetermined size) to enhance access performance, and more particularly, searching the pre-loaded MMU table such as the MMU table TABLE(0) during the access process to convert virtual addresses to associated physical addresses as a target position of an access operation to access data.

When a first operator engine (for example, the operator #1 engine ENG(1), denoted as "operator #1" for brevity) of the operator engines 120 performs a first calculation operation to generate a first calculation result, the DMA engine 110 may determine a memory region (for example, a certain memory region in the tensor memory 400) located in the RAM such as the SRAM 130 or the external RAM such as the DRAM 30 according to the pre-loaded MMU table such as the MMU table TABLE(0), and store the first calculation result in the memory region (denoted as "stored by DMA" for better understanding). Further, when a second operator engine (for example, the operator #2 engine ENG(2), denoted as "operator #2" for brevity) of the operator engines 120 performs a second calculation operation to generate a second calculation result, the DMA engine 110 may determine the memory region (for example, the same memory region in the tensor memory 400) according to the pre-loaded MMU table such as the MMU table TABLE(0), and read and load the first calculation result from the memory region to the buffer (denoted as "loaded by DMA" for better understanding) in the second operator engine, so as to allow the second operator engine to perform the second calculation operation according to the first calculation result.

For either of the situations of storing the first calculation result in the memory region (for example, "stored by DMA") and reading and loading the first calculation result from the memory region to the second operator engine (for example, "loaded by DMA"), the DMA engine 110 may operate according to an operation process 900 of the DMA control solution. More particularly, a variable address may be used as a virtual address for a look-up operation, a physical address corresponding to this virtual address may be looked up from the pre-loaded MMU table (denoted as "MMU table" for brevity) according to this virtual address, and physical address determination is performed to determine whether this physical address belongs to an SRAM address or a DRAM address. For example, when the physical address belongs to an SRAM address, the DMA engine 110 may access (for example, reading or writing) the first calculation result from the SRAM 130 according to the physical address. For another example, when the physical address belongs to a DRAM address, the DMA engine 110 may access (for example, reading or writing) the first calculation result from the DRAM 30 according to the physical address. For brevity, similar details in this embodiment are not repeated.

Figure 10:
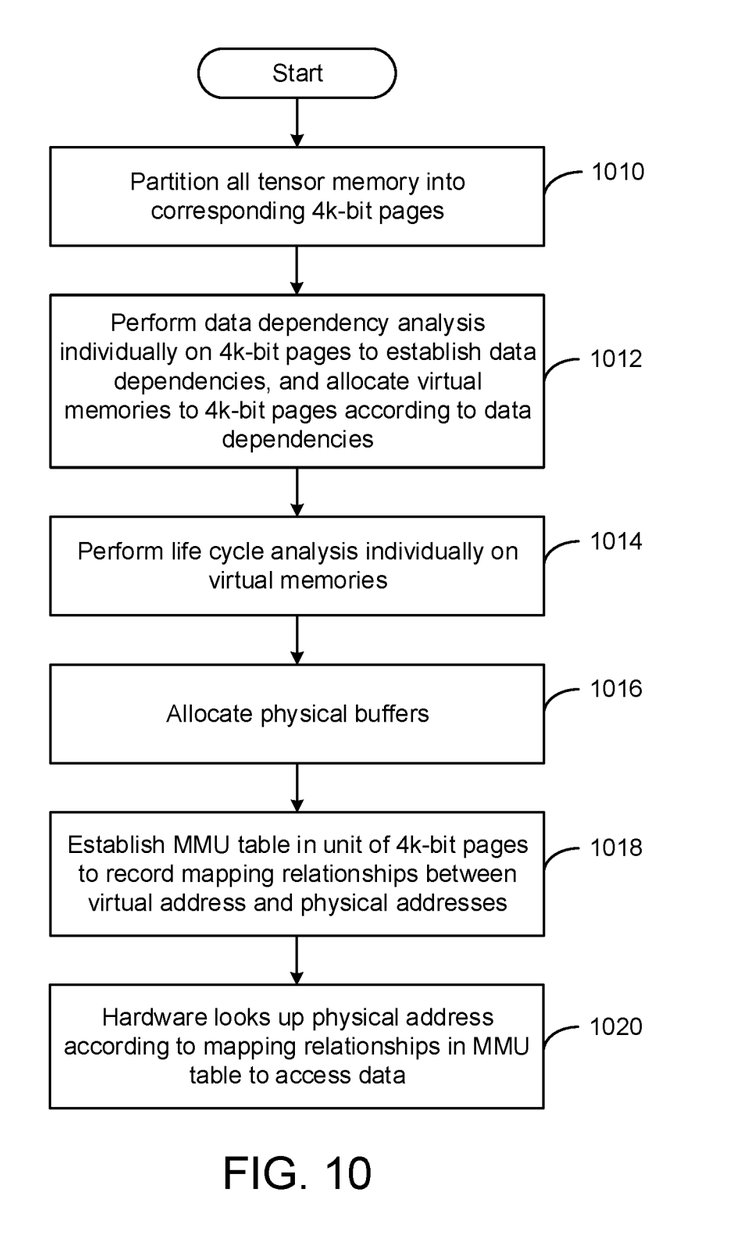
FIG. 10 is an operation process of the configuration method according to an embodiment of the present invention.

FIG. 10 shows an operation process of the configuration method according to an embodiment of the present invention. The operations and related details of steps 1010, 1012, 1014, 1016, 1018 and 1020 may be as described in the embodiments above, wherein the plurality of predetermined unit pages may be described as a plurality of 4k-bit pages for better understanding; however, the present invention is not limited to the examples above. For example, in step 1018, the production tool may be configured to establish the plurality of predetermined MMU tables by using a unit of 4k-bit pages, so as to record mapping relationships between virtual addresses and physical addresses. Further, in step 1020, hardware (for example, the DMA engine 110) of the integrated circuit 100 may look up the at least one physical address according to the at least one mapping relationship in the pre-loaded MMU table in the utilization stage so as to access data. For brevity, similar details in this embodiment are not repeated.

The integrated circuit 100 and the configuration method thereof of the present invention are capable of implementing extremely complicated calculations of the neural network model using limited memory resources, and more particularly, converting memory units from tensors to 4k-bit pages and tracking back utilization periods of data of the pages according to life cycles so as to allocate actual physical addresses without considering issues of consecutiveness of addresses, for example, associating discrete physical addresses with consecutive virtual addresses by means of mapping relationships in an MMU table, so that the level of multiplexing of memory spaces can be significantly enhanced and waste in memory space can be avoided, thereby minimizing allocated memory spaces. Compared to the prior art, the integrated circuit 100 and the configuration method thereof of the present invention are capable of implementing a compact, fast and reliable electronic product without bringing side-effects or less likely incurring side-effects.

The description above provides merely preferred embodiments of the present invention, and all variations and modifications made based on the range of claims of the present invention are to be encompassed within the scope of the present invention.

What is claimed is:

1. An integrated circuit, applied to a neural network model calculation, comprising:
    a first operator engine, configured to perform a first calculation operation;
    a second operator engine, configured to perform a second calculation operation;
    a random access memory (RAM); and
    a direct memory access (DMA) engine, configured to perform an access operation on the RAM according to a first memory management unit (MMU) table when the first operator engine performs the first calculation operation, and to perform an access operation on the RAM according to a second MMU table when the second operator engine performs the second calculation operation.

2. The integrated circuit according to claim 1, wherein the first MMU table is loaded to a memory region corresponding to the DMA engine before the first calculation operation is performed, and the second MMU table is loaded to the memory region corresponding to the DMA engine before the second calculation operation is performed.

3. The integrated circuit according to claim 1, wherein the DMA engine stores a calculation result of the first calculation operation to a memory region of the RAM or an external RAM according to the first MMU table, and the DMA engine reads the calculation result from the memory region according to the second MMU table for the second operator engine to perform the second calculation operation.

4. The integrated circuit according to claim 3, wherein the calculation result corresponds to a first virtual address; the DMA engine searches the first MMU table according to the first virtual address to obtain a physical address of the memory region, and accordingly stores the calculation result to the memory region; and the DMA engine searches the second MMU table according to a second virtual address to obtain the physical address of the memory region, and accordingly reads the calculation result for the second operator engine to perform the second calculation operation, wherein the first virtual address is different from the second virtual address.

5. The integrated circuit according to claim 1, wherein when the first calculation operation is performed, the DMA engine reads a set of data from a memory region of the RAM or an external RAM according to the first MMU table for the first operator engine to perform the first calculation operation, and the DMA engine stores a calculation result of the first calculation operation to the memory region according to the first MMU table.

6. A configuration method of an integrated circuit, comprising:
    partitioning tensor memories needed for a calculation of a neural network model into to a plurality of corresponding predetermined unit pages;
    performing data dependency analysis individually on the plurality of predetermined unit pages to establish a plurality of data dependencies, and allocating a plurality of virtual buffers to the plurality of predetermined unit pages according to the plurality of data dependencies;
    performing life cycle analysis individually on the plurality of virtual buffers, wherein an analysis result of the life cycle analysis indicates respective life cycles of the plurality of virtual buffers;
    allocating a plurality of physical buffers according to the analysis result; and
    establishing a plurality of predetermined memory management unit (MMU) tables to record mapping relationships between virtual addresses and physical addresses, so as to allow the integrated circuit to look up at least one physical address for data access according to at least one mapping relationship in a pre-loaded MMU table in a utilization stage, wherein the pre-loaded MMU table is selected from the plurality of predetermined MMU tables.

7. The configuration method according to claim 6, wherein the integrated circuit selects a first predetermined MMU table corresponding to a first calculation operation of a plurality of calculation operations from the plurality of predetermined MMU tables, as the pre-loaded MMU table, so as to allow a first operator engine of a plurality of operator engines to complete the first calculation operation.

8. The configuration method according to claim 7, wherein the integrated circuit selects a second predetermined MMU table corresponding to a second calculation operation of the plurality of calculation operations from the plurality of predetermined MMU tables, as the pre-loaded MMU table, so as to allow a second operator engine of the plurality of operator engines to complete the second calculation operation.

9. The configuration method according to claim 6, wherein the integrated circuit dynamically selects one of the plurality of predetermined MMU tables as the pre-loaded MMU table so as to update the pre-loaded MMU table.

10. The configuration method according to claim 6, wherein the integrated circuit loads one of the plurality of predetermined MMU tables to a predetermined position of a random access memory (RAM) as the pre-loaded MMU table.

11. The configuration method according to claim 6, wherein the plurality of predetermined unit pages have a common page size, and the common page size is defined by a predetermined bit count.

12. The configuration method according to claim 11, wherein the predetermined bit count is equal to 4k, where k=1024, and the plurality of predetermined unit pages represent a plurality of 4k-bit pages.

* * * * *